US006667747B1

(12) United States Patent
Spellman et al.

(10) Patent No.: US 6,667,747 B1
(45) Date of Patent: Dec. 23, 2003

(54) METHOD AND APPARATUS FOR PROVIDING A HYPERLINK WITHIN A COMPUTER PROGRAM THAT ACCESS INFORMATION OUTSIDE OF THE COMPUTER PROGRAM

(75) Inventors: Cynthia E. Spellman, St. Paul, MN (US); Daniel Dodge, St. Paul, MN (US); Jane K. Sellberg, Brooklyn Park, MN (US)

(73) Assignee: Unisys Corporation, Blue Bell, PA (US)

( * ) Notice: Subject to any disclaimer, the term of this patent is extended or adjusted under 35 U.S.C. 154(b) by 985 days.

(21) Appl. No.: 08/852,654

(22) Filed: May 7, 1997

(51) Int. Cl.[7] .................................................. G09G 5/00
(52) U.S. Cl. ...................................... 345/714; 345/738
(58) Field of Search ................................. 345/336, 337, 345/338, 705, 706, 707, 708, 709, 710, 712, 713, 714, 738, 739

(56) References Cited

U.S. PATENT DOCUMENTS

| | | | |
|---|---|---|---|
| 5,361,361 A | * | 11/1994 | Hickman et al. ............ 345/340 |
| 5,434,963 A | * | 7/1995 | Kuwamoto et al. .......... 345/338 |
| 5,581,670 A | | 12/1996 | Bier et al. ................... 345/326 |
| 5,581,684 A | | 12/1996 | Dudzik et al. ............... 345/338 |
| 5,581,686 A | | 12/1996 | Koppolu et al. .............. 345/340 |
| 5,584,035 A | | 12/1996 | Duggan et al. .............. 345/339 |
| 5,793,966 A | * | 8/1998 | Amstein et al. ......... 395/200.33 |

OTHER PUBLICATIONS

Microsoft Word for Windows 95, Version 7.0, Copyright 1983–1995 Microsoft Corporation.
Micron Help, Version 1.1G, Copyright 1996, Micron Electronics, Inc.
Microsoft Windows 95, Copyright 1981–1995, Microsoft Corporation.

* cited by examiner

*Primary Examiner*—Ba Huynh
(74) *Attorney, Agent, or Firm*—Charles A. Johnson; Mark T. Starr; Nawrocki, Rooney & Sivertson PA

(57) ABSTRACT

Method and apparatus for providing a hyperlink within a computer program that access information outside of the computer program. In a preferred embodiment, the hyperlink is provided in a first help file within a first autonomous computer program, wherein the hyperlink references information in a second help file. The activation of the hyperlink causing a second autonomous computer program to access and display the second help file to the user.

13 Claims, 13 Drawing Sheets

| SECTION | PARAMETER | DESCRIPTION |
|---|---|---|
| [UNILIB] | UNILIB_VERSION | VERSION NUMBER OF THE UNILIB PROGRAM |
| | BROWSER | NAME OF THE TYPE OF BROWSER (FOR THIS RELEASE, THE VALUE "DTEXT" WILL BE USED). THIS NAME CORRESPONDS TO A SUBSEQUENT SECTION IN THE INITIALIZATION FILE |
| [DTEXT] | DOC_INDEX | PATHNAME AND FILENAME OF THE DOCUMENT INDEX (UNILIB.IDX). |
| | TOPIC_INDEX | PATHNAME AND FILENAME OF THE TOPIC INDEX (UNILIB.DAT). |
| | PROGRAM | PATHNAME AND FILENAME OF THE DYNATEXT BROWSER EXECUTABLE. TWO BROWSER EXECUTABLES WILL BE ABLE TO BE USED: <br>○ DTEXTRW.EXE FOR CUSTOMER USE (THE RUN-TIME VERSION) <br>○ DTEXT.EXE FOR INFORMATION DEVELOPER AND REVIEWER USE (THE FULL-ACCESS VERSION) |
| | DTEXT_INI_PATH | PATHNAME TO THE LOCATION OF THE DYNATEXT.INI FILE FOR THE EDITION. |
| | EDITION_NAME | NAME OF THE EDITION (FOR EXAMPLE, CPIX1_1 OR CPIX2_01. |
| | COLLECTION_NAME | STRING VALUE OF THE NAME OF THE DYNATEXT COLLECTION IN THE DYNATEXT.INI FILE (FOR EXAMPLE, "CLEARPATH 1.1 DOCUMENTATION"). |

```
[ UNILIB ]
UNILIB_VERSION = 1.0
BROWSER = DTEXT

[ DTEXT ]
DOC_INDEX = C:\PATHMATE\UNILIB.IDX
TOPIC_INDEX = C:\PATHMATE\UNILIB.DAT
PROGRAM = C:\EBT\BIN\DTEXTRW.EXE
DTEXT_INI_PATH = C:\EBT\BIN\DYNATEXT.INI
EDITION_NAME = CPIX1_1
COLLECTION_NAME = "CLEARPATH 1.1 DOCUMENTATION"
```

| FIELD | DATA TYPE | SIZE | REQUIRED | DESCRIPTION |
|---|---|---|---|---|
| DOCUMENT NUMBER | NUMBER | 8 | YES | THE BASE DOCUMENT NUMBER OF THE DESTINATION DOCUMENT. |
| LIBRARY NAME | NAME | 8 | YES | THE NAME OF THE DYNATEXT LIBRARY THAT CONTAINS THE DOCUMENT. |
| DOCUMENT ID PREFIX | SGML IDENTIFIER | 3 | YES | THE SGML IDENTIFIER PREFIX FOR THE TOPIC WITHIN THE LIBRARY. THIS IS FROM THE EDITION DEFINITION. |
| TOPIC INDEX OFFSET | NUMBER | 8 | YES | BYTE OFFSET TO THE FIRST RECORD IN THE TOPIC INDEX (UNILIB.DAT) FOR THE DOCUMENT TOPICS. |
| EDITION NAME | NAME | 8 | NO* | THE NAME OF THE EDITION FOR EXAMPLE, CPIX1.1). |

* THIS FIELD MAY BE USED IN A FUTURE RELEASE.

_352_

```
78449139.4GLIB.AAC.749
...
78449272.COMM.XYY.10942
78449324.COMM.XYZ.11023
...
78449824.LANG.AAQ.27249
```

FIG. 12

| FIELD | DATA TYPE | SIZE | REQUIRED | DESCRIPTION |
|---|---|---|---|---|
| DOCUMENT TOPIC ID | SGML IDENTIFIER | 11 | YES | THE TOPIC ID VALUE IN THE DYNATEXT DATABASE. THIS IS THE CONCATENATION OF THE DOCUMENT ID PREFIX AND THE DOCUMENT'S TOPIC ID. THE DOCUMENT TOPIC ID IS THE SGML IDENTIFIER FOR THE <LEV1>, <LEV2>, <LEV3>, <LEV4>, <LEV5>, OR <APX> IN THE DESTINATION DOCUMENT. |

380

384

382

```
AACTHING1
AACTHING2

XYY1SECT1
XYYCONFIG

XYZ2SECT1
XYZTUNING

AAOTHING99
```

FIG. 13

METHOD AND APPARATUS FOR PROVIDING A HYPERLINK WITHIN A COMPUTER PROGRAM THAT ACCESS INFORMATION OUTSIDE OF THE COMPUTER PROGRAM

CROSS REFERENCE TO CO-PENDING APPLICATIONS

The present application is related to U.S. patent application Ser. No. 08/852,507, filed May 7, 1997, entitled "Operator Assistance for Heterogenous Data Processing Systems", and U.S. patent application Ser. No. 08/852,509, filed May 7, 1997, entitled "Operator Assistance for Data Processing Systems", both of which are assigned to the assignee of the present invention and incorporated herein by reference.

BACKGROUND OF THE INVENTION

1. Field of the Invention

The present invention relates generally to help systems for computer programs, and more particularly relates to help systems that use hyperlinks therein.

2. Description of the Prior Art

It is known to provide documentation for the purpose of permitting a user to operate a data processing system. With the earliest data processing systems, this documentation took the form of user manuals which described the operation and utilization of the corresponding data processing system.

As systems were designed to be more interactive, it became common to provide user documentation within the data processing software itself. Today, many application programs provide help systems for assisting in the use of the application program. Often, these help systems are accessed by a help menu, whereby the user views the desired help information by selecting the appropriate category from the help menu. One such help system is that provided by the Microsoft Windows™ operating system and compatible applications.

In the Microsoft Windows™ operating system, a help engine is typically provided which interprets and displays the desired help information. For Microsoft Windows™ compatible applications, the help information is typically compiled into a ".hlp" file, which is compatible with the Microsoft Windows™ help engine. The Windows™ help engine reads the compiled help database, and displays the desired information in the Microsoft Windows™ environment.

For Microsoft Windows™ compatible application programs, identifiers are often placed in the executable code of the application program. Corresponding identifiers are provided in the compiled help file. The correspondence between the identifiers in the application program and the identifiers in the help file is often provided in a correspondence table contained in the compiled help file. By providing this correspondence, the selection of a particular help topic within the application program may retrieve the corresponding help information from the compiled help file.

A limitation of this approach is that help information can only be added or updated by providing a new compiled help file. In addition, to provide corresponding identifiers in the application program, a new executable for the application program is typically required. One attempt to externalize the help function from the application program is suggested by U.S. Pat. No. 5,581,684, issued to Dudzik et al. Such externalization permits the addition of help information after finalization of the application program without disturbing the basic application.

In many help systems, hyperlinks are provided within the help database. Hyperlinks are essentially an electronic link between selected sections of the help documentation. For example, in many Microsoft Windows™ compatible application programs, selected words in the help database are colored, underlined, or otherwise distinguishable from the other text, indicating that the word is a hyperlink to another portion of the help database. By clicking on the hyperlink, the portion of the help database that describes the function or meaning of the word is displayed to the user. This provides an easy way for the user to gain an understanding of the word and/or function it represents within the software. Often, a "BACK" menu option is provided to return the user to the original location within the help database.

Hyperlinks are often implemented using a simple "goto" type function. To support the hyperlinks, the help database is typically electronically "tagged", and each hyperlink is hardcoded with the desired tag name. When the hyperlink is activated, the help system jumps to the hardcoded location indicated in the hyperlink. The Microsoft Windows™ help engine typically stores a return location to support a "BACK" function, which returns the user to an original location within the help database.

Prior art help systems suffer from a number of limitations, some of which are discussed below. First, each application program typically only includes help information that is related to its own operation. Thus, a user typically does not have access to help information for other application programs without manually opening up another in application program and scrolling through the help menu to find the appropriate information. This can be time consuming and tedious, for example, when the user desires assistance regarding the interoperability of different application programs within a single computer, or the interoperability of multiple applications hosted on multiple and heterogeneous computer platforms. Heterogeneous in this context means computer platforms having different software and system architectures. Oftentimes, such interoperability issues are completely outside the scope of all of the user documentation.

Second, most help systems typically only include a subset of the information that is available. For example, many application programs and operating systems have more extensive and detailed information in a user manual that is provided with the software. Thus, if the information required by the user is not within the help system of the application program, the user must manually locate the user manual and the appropriate information therein. In addition, and because the help database must typically be in a specific format before it can be accessed by the application program (e.g. compiled), help information that is not compatible with the help engine of the application program typically cannot be accessed by the user online. Thus, all help information that is not compatible with the help engine of the application program, such as an electronic version of a user manual, may not be accessed by the user from within the application program.

SUMMARY OF THE INVENTION

The present invention overcomes many of the disadvantages associated with the prior art by providing a hyperlink in a computer program help file that accesses help information that is not included with the computer program software. Although the present invention is described with reference to an application program, it is equally applicable to help systems for operating systems and the like.

In an illustrative embodiment of the present invention, a first application program help file is provided with a hyperlink in the conventional manner. Unlike the prior art, however, the hyperlink of the present invention has associated therewith a number of parameters including a name of an appropriate remote access macro. Also included with the hyperlink may be a number of ID codes or parameters that identify the location of a desired help file and a desired portion or section within the desired help file.

When a user activates the hyperlink of the present invention, the remote access macro that is referenced by the hyperlink is executed. Selected parameters provided by the hyperlink are passed to the remote access macro. Preferably, the remote access macro then opens an appropriate second application program that is capable of reading the desired help file. The remote access macro passes selected parameters to the newly opened second application program. The second application program uses the parameters to identify and open the appropriate help file or files and display the desired portion or section indicated by the parameters.

Preferably, the first application program is compatible with the Microsoft Windows™ format. As indicated above, most Microsoft Windows™ based application programs have compiled help files that are distributed with the corresponding application program. The help information is then displayed using a Microsoft Windows™ help engine. The Microsoft Windows™ help engine allows application developers to include specific code within the help files to execute macros or commands in the DOS or Windows™ operating system. Further, the Microsoft Windows™ help engine allows selected parameters to be passed to those macros. Thus, the Microsoft Windows™ help engine is particularly suitable for the implementation of the present invention.

The Microsoft Windows™ help engine is capable of interpreting tags or other code in the help files. These tags may correspond to a target address in a hyperlink operation. The Microsoft Windows™ help engine includes functions for setting up and performing such hyperlink operations within a single help file.

The second application program, which is opened by the remote access macro, may be any application program that can read the desired help files. For example, the second application program may be another Microsoft compatible application. However, and in this case, the Windows™ help engine in the second application program may have to be modified to receive the input parameters from the remote access macro. Finally, it is contemplated that the second application program may be the DynaText™ Browser program, an internet browser program, a text editor, or any other program that can read and display help file information. Thus, it is contemplated that literally any type of computer program may be opened by the remote access macro to display the desired help information.

Although not required for providing a hyperlink in accordance with the present invention, it is recognized that for the hyperlink to identify a particular portion or section in the desired help file, the application program and/or remote access macro typically must have the capability to identify tags or other identifiers within the corresponding help file. Similarly, the help file must have tags or some other identifiers placed in the appropriate locations. If these requirements are met, the parameters passed to the second application program from the remote access macro may be used to identify a particular tag or identifier within the desired help file, and immediately display the desired section or portion of the desired help file.

The desired help files may be located either on the same data processing system as the original application program or on a different data processing system. When located on a different data processing system, the second application program preferably accesses the desired help files via a network or the like. An illustrative example of such a configuration may be when the second application program is an internet browser. In this configuration, the remote access macro may pass an internet address to the internet browser, and the internet browser may use the internet address to access the corresponding server or site, and display the desired help information on the local data processing system. It is contemplated that the internet browser may have the capability to identify a particular location within the desired help file.

One particular advantage of having a help database located at a remote site, such as an internet site, is that potentially more help information can be provided and maintained than is economically feasible if distributed with the software. For example, the entire user manual may be provided on-line at the software developers internet site. Likewise, help information relating to other software programs, and the interoperability therebetween may be provided. In addition to the ability to provide more information, it is also contemplated that the help information may be more easily updated by the software developer. For example, the software developer may change selected sections within the help database by including, for example, answers to frequently asked questions received from other users of the software.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like referenced numerals designate like parts throughout the figures thereof and wherein:

FIG. 11 is a table showing the preferred fields for the UNILIB.INI file of FIG. 10;

FIG. 12 is a table showing the preferred fields for the document index (UNILIB.IDX) file of FIG. 10; and FIG. 13 is a table showing the preferred fields for the topic index (UNILIB.DAT) file of FIG. 10.

DETAILED DESCRIPTION OF THE PREFERRED EMBODIMENTS

Figure 1:
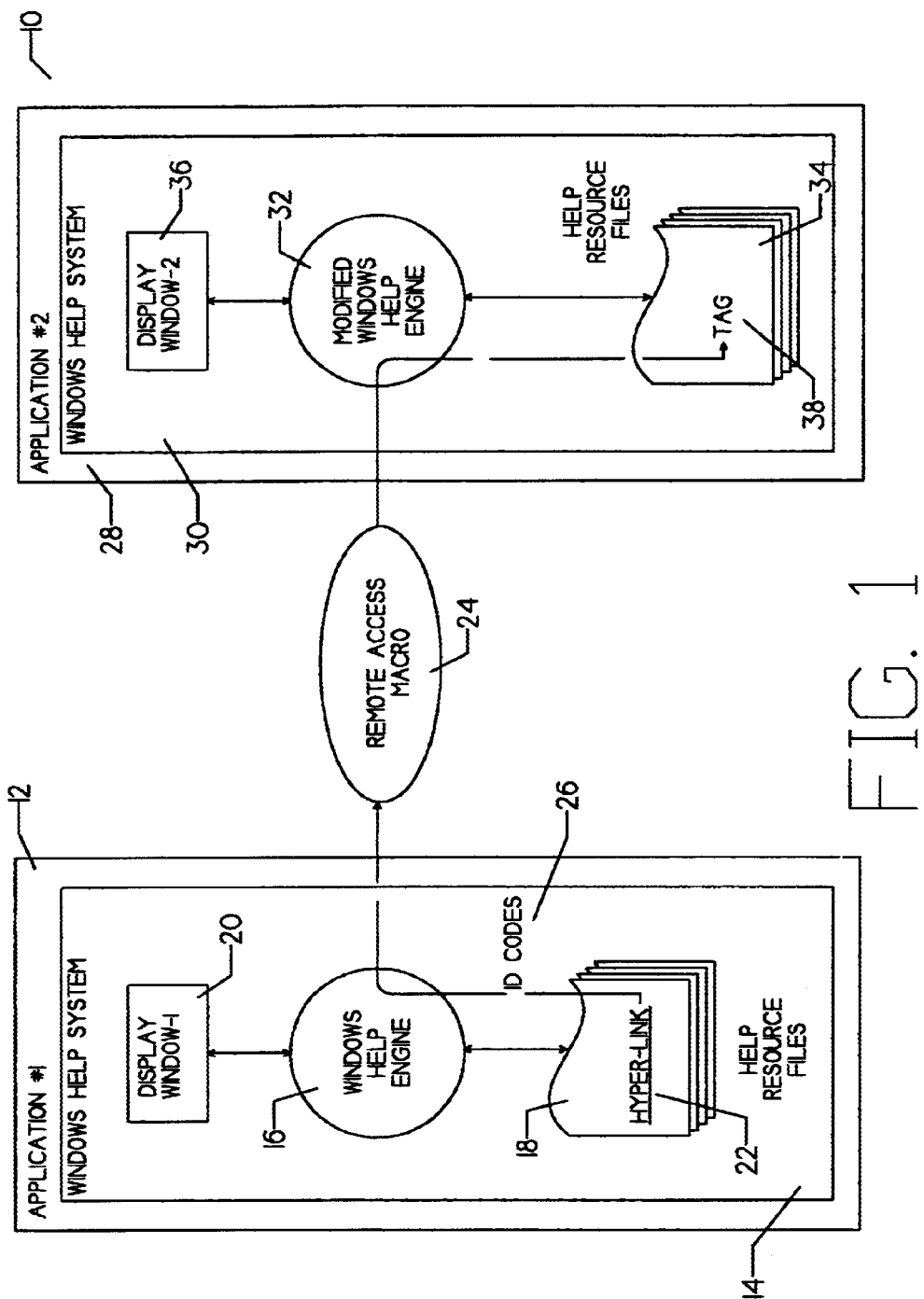
FIG. 1 is a block diagram showing the execution of a hyperlink in accordance with a first embodiment of the present invention.

FIG. 1 is a block diagram showing the execution of a hyperlink in accordance with a first embodiment of the present invention. The diagram is generally shown at 10, and includes a first application program 12 and a second application program 28. Preferably, the first application program 12 and the second application program 28 are running on a data processing system (not shown) such as a personal computer.

For purposes of this discussion, only the first application program 12 is initially running on the data processing system. If a user desires to view selected help information relating to the first application program 12, the user may invoke a help system 14. This is typically done using a help menu in the first application program 12.

Preferably, the first application program 12 is compatible with the Microsoft Windows™ format. Thus, when the user invokes the help system, a Microsoft Windows™ compatible help system 14 is invoked, as shown. The Microsoft Windows™ help system 14 includes a Windows™ help engine 16 that controls the operation of the Windows™ help system 14. The Windows™ help engine 16 can read the help resource files 18, and display selected portions thereof in a first window 20 on the display device of the data processing system. For Microsoft Windows™ compatible applications such as the first application program 12, the help resource files 18 are typically compiled, and distributed with the application program 12.

Often, hyperlinks are provided in one or more of the help resource files 18. Hyperlinks are essentially an electronic link between selected sections of the help resource files 18. For example, in many Microsoft Windows™ compatible application programs, selected words in the help database are colored, underlined, or otherwise distinguishable from the other text, indicating that the word is a hyperlink to another portion of the help database. By clicking on the hyperlink, the portion of the database that describes the function or meaning of the corresponding word or phrase is displayed to the user. This provides an efficient way for the user to gain an understanding of the function that the hyperlinked word or phrase represents within the software. Often, a "BACK" menu option is provided to return the user to the original location within the help database.

Hyperlinks are often implemented by invoking a simple "goto" type function that is supported by the Microsoft Windows™ help engine 16. To support the hyperlinks, the help resource files 18 are typically electronically "tagged", and each hyperlink is hardcoded with the identity of a corresponding tag. When the hyperlink is activated, the Microsoft Windows™ help engine jumps to the hardcoded location indicated in the hyperlink. A return location may be stored to support the "BACK" function, which returns the user to an original location within the help database.

In the illustrative embodiment of the present invention, the first application program help resource file 18 is provided with a hyperlink 22 in the conventional manner. Unlike the prior art, however, the hyperlink 22 of the present invention has associated therewith a number of parameters including a name of an appropriate remote access macro 24. Also included with the hyperlink may be a number of ID codes 26 or parameters that identify a desired help resource file 34 and a desired location within a desired help resource file 34.

When a user activates the hyperlink 22 of the present invention, the remote access macro 24 referenced by the hyperlink 22 is executed. This is accomplished by using standard functions of the Microsoft Windows™ help engine. It is known that the Microsoft Windows™ help engine 16 allows application developers to include specific code within the help resource files 18 to execute macros or commands in the DOS or Windows™ operating system. Further, it is known that the Microsoft Windows™ help engine 16 allows selected parameters to be passed to those macros. Thus, the Microsoft Windows™ help engine 16 may be used to pass selected parameters or ID codes 26 provided by the hyperlink 22 to the remote access macro 24, as shown.

The remote access macro 24 opens an appropriate second application program 28 that is capable of reading the desired help resource file 34. The second application program 28 is preferably either a Windows™ help engine, or another application program that includes a Windows™ help engine, as shown. However, it is recognized that the second application program 28 may be any application program that is capable of reading the desired help resource files 34.

The remote access macro 24 passes selected parameters 26 to the newly opened second application program 28, and in the embodiment shown, to the Microsoft Windows™ help engine 32. The remote access macro 24 may convert the form of the parameters or ID codes 26 to be compatible with the second application program 28. The Microsoft Windows™ help engine 32 of the second application program 28 uses the parameters (ID codes 26) to identify and open the appropriate help resource file 34 and display the desired portion or section indicated by the parameters in a second window 36 on the display device of the data processing system. It is recognized that the Windows™ help engine 32 may have to be modified to receive the input parameters from the remote access macro 24. Also, and as indicated above, it is recognized that the second application program may be the Windows™ help engine.

For the hyperlink 22 to identify a particular portion or section in the desired help resource file 34, the second application program 28 typically must have the capability to identify tags or other identifiers within the corresponding help resource file 34. It is known that the Microsoft Windows™ help engine is capable of interpreting compatible tags or other codes. These tags may correspond to a target location specified in the hyperlink 22. The Microsoft Windows™ help engine includes functions for setting up and performing such hyperlink operations within a single help file.

To support the "tag" function, it is contemplated that the desired help resource file 34 may have a tag 38 or some other identifier placed in an appropriate location, as shown. The ID codes 26 or parameters passed to the second application program 28 from the remote access macro 24 may be used by the Microsoft Windows™ help engine 32 to identify tag 38 within the desired help resource file 34. Once identified, the Microsoft Windows™ help engine 32 may display the desired section or portion of the desired help resource file 34 in a second window 36.

Although the above description is directed to an illustrative embodiment of the present invention, it is contemplated that the function of the remote access macro may be incorporated into the Microsoft Windows™ Help Engine 16. Thus, the term remote access macro refers generally to the corresponding function described above, and is not limited to a separate program or macro that is executed outside of the first application program. In addition, it is contemplated that the Microsoft Windows™ help engine 32 of the second application program 28 may display the selected section or portion of the desired help resource file 34 in the first window 20 of the first application program 12.

Figure 2:
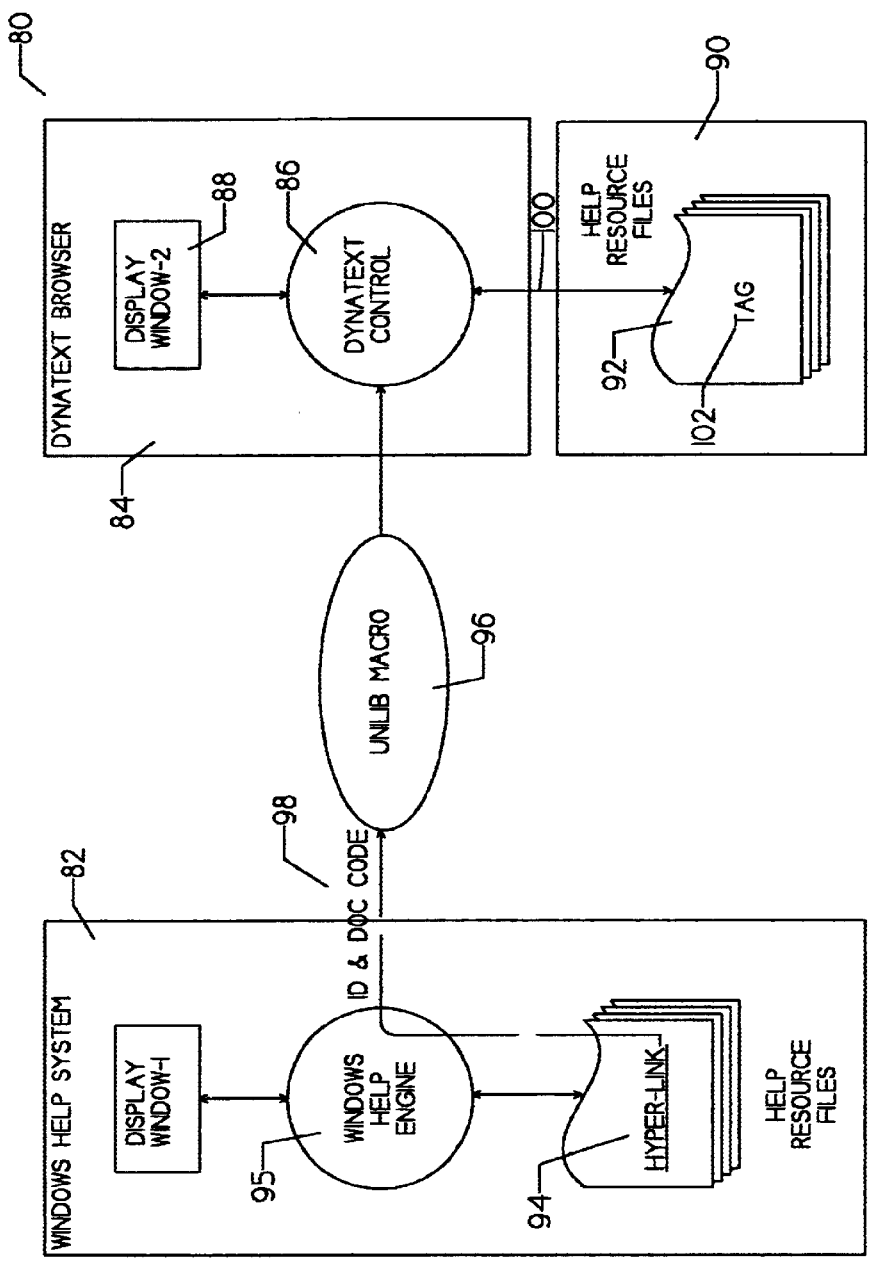
FIG. 2 is a block diagram showing the execution of a hyperlink in accordance with a second embodiment of the present invention.

FIG. 2 is a block diagram showing the execution of a hyperlink in accordance with a second embodiment of the present invention. This embodiment operates similar to that discussed above with reference to FIG. 1, except that the second application program 84 is a document browser program that may or may not be compatible with the Microsoft Windows™ format. In the preferred embodiment, the second application program is the DynaText browser program 84. The DynaText browser program is commercially available from the Inso Corporation.

The DynaText browser program 84 is capable of reading and displaying files that are not compatible with the Microsoft Windows™ help system. As indicated above, the help resource files that accompany a Windows™ compatible application program are typically compiled, and are distributed with the application program. By accessing the DynaText browser program, a hyperlink 94 can access help resource files and other information that is not compiled or otherwise compatible with the Microsoft Windows™ help engine 95, and in particular files that are compiled into a particular SGML (Standard Generalized Markup Language) format. This may increases the types of documents that can be retrieved from a Microsoft Windows™ compatible application.

When a user activates the hyperlink 94 of FIG. 2, the remote access macro, or in this case the UNILIB macro. 96, is executed. The hyperlink includes a parameter that identifies the UNILIB macro 96. The Microsoft Windows™ help engine 95 then passes selected parameters or ID codes 98 to the UNILIB macro 96, as shown. Preferably, the ID codes 98 include a document code for identifying a particular one of the desired help resource files 92, and a tag code for identifying a particular location therein.

The UNILIB macro 96 opens the DynaText browser program 84 and passes the ID codes 98 to the DynaText browser program 84. It is contemplated that the UNILIB macro 96 may convert the form of the parameters or ID codes 98 to be compatible with the DynaText browser program 84. The DynaText controller 86 uses the ID codes 98 to identify and open the appropriate help resource file 92 and display the desired portion or section indicated by the parameters in a second window 88 on the display device of the data processing system.

The DynaText browser program 84 can identify tags or other identifiers within the corresponding help resource file 92. Thus, for the hyperlink 94 to identify a particular location in the desired help resource file 92, the desired help resource file 92 may have a tag 102 or some other identifier placed in an appropriate location, as shown. The ID codes 98 or parameters passed to the DynaText browser program 84 from the UNILIB macro 96 may be used by the DynaText browser program 84 to identify tag 102 within the desired help resource file 92. Once identified, the DynaText browser program 84 may display the desired section or portion of the desired help resource file 92 in a second window 88.

The desired help resource files 92 may be located either on the same data processing system as the original application program 82 or on a different data processing system. Preferably, the help resource files are provided on a CD-ROM that is accessible by the DynaText browser program 84. However, it is also contemplated that the DynaText browser program could access the desired help files via a network or the like. The interface 100 thus may be a direct link to a memory, CD-ROM drive, or other memory device within a single data processing system. Alternatively, the interface 100 may be a LAN, or other type of network including an internet or intranet network.

Figure 3:
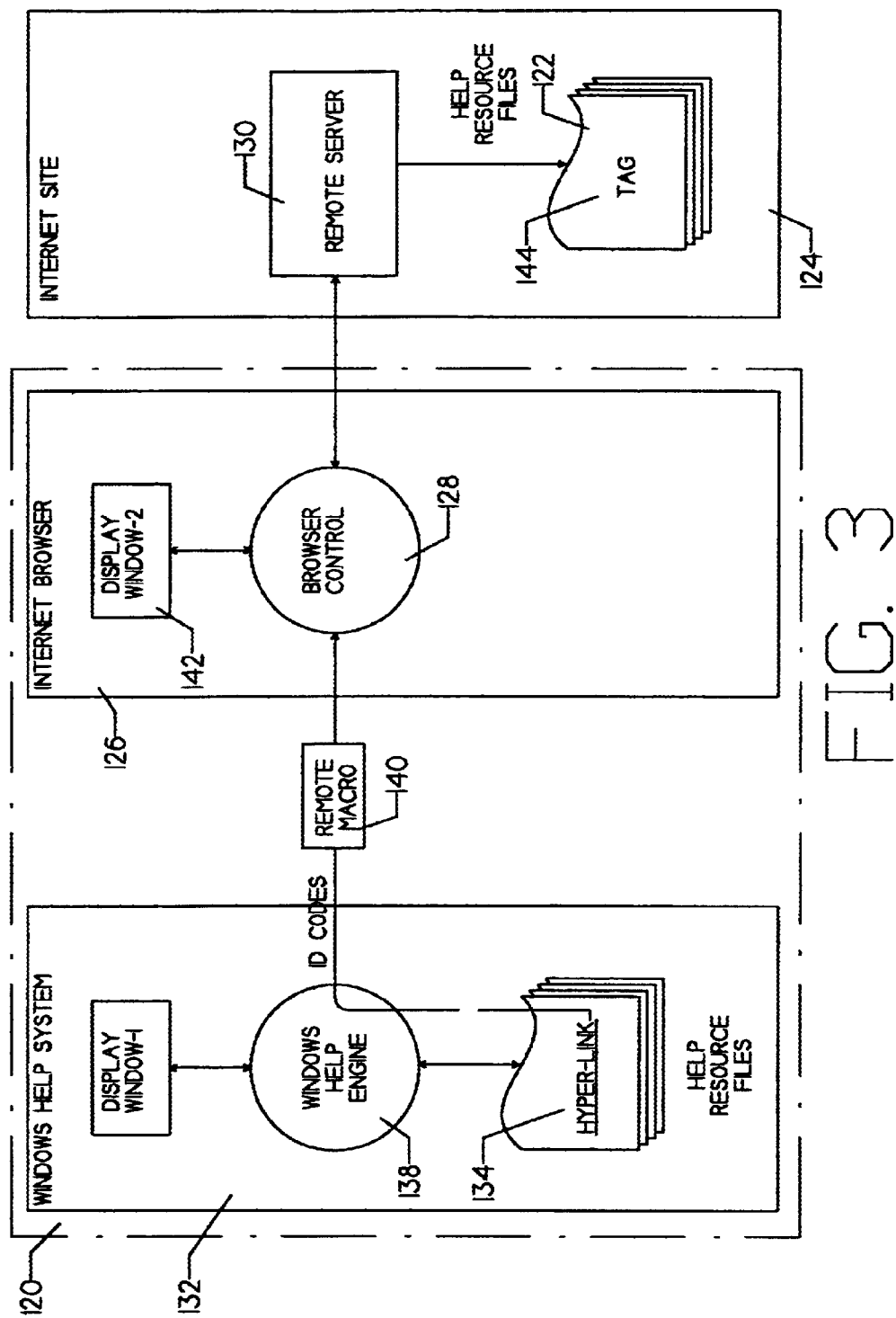
FIG. 3 is a block diagram showing the execution of a hyperlink in accordance with a third embodiment of the present invention.

An illustrative example of this latter configuration is shown in FIG. 3. A first data processing system is shown at 120, which executes both the Microsoft Windows™ help system 132 of the first application program, and an internet browser program 126. As discussed above, the hyperlink 134 provides the name of a remote access macro and a number of ID codes to the Microsoft Windows™ help engine 138. The Microsoft Windows™ help engine 138 then launches the remote access macro 140 and passes the ID codes thereto. The remote access macro 140 then launches the internet browser program 126, and passes the ID codes thereto.

It is contemplated that the remote access macro 140 may convert the ID codes to be compatible with the internet browser program 126. Preferably, the ID codes specify, inter alia, an internet address. The internet browser program 126 uses the internet address to locate a remote server 130 at an internet site 124. The ID codes may also identify the desired help resource file 122, and the desired tag 144 therein.

The remote server 130 may then return the desired section or portion of the help resource file to the internet browser program 126. The internet browser program 126 may then display the desired section or portion in a second window 142, as shown.

Rather than having the remote server 130 identify the desired section or portion of the help resource file, it is contemplated that the remote server may simply provide the desired help resource file, including all of the tags therein, to the internet browser program 126. The internet browser program may then use the ID codes to identify the desired section or portion of the help resource file, and display it in the second window 142.

An advantage of having a help database located at a remote site, such as an internet site, is that potentially more help information can be provided and maintained than is economically feasible if distributed with the software. For example, the entire user manual may be provided on-line at the software developers internet site. Likewise, help information relating to other software programs, and the interoperability therebetween may be provided.

In addition to the ability to provide more information, it is also contemplated that the help information may be more easily updated by the software developer. For example, the software developer may change or add to selected sections within the help database by including, for example, answers to frequently asked questions received from customers of the software developer.

Figure 4:
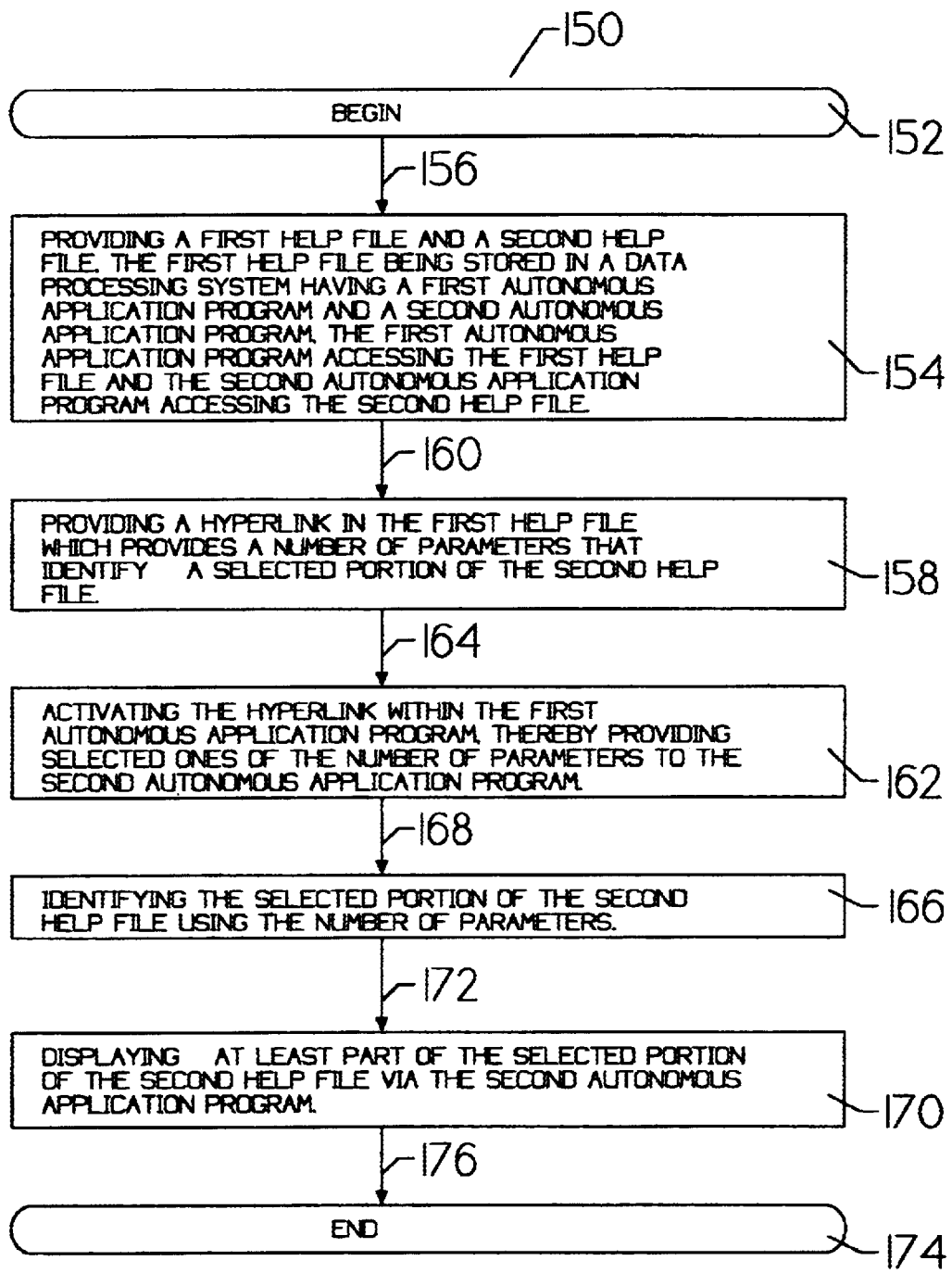
FIG. 4 is a flow diagram of an illustrative first method of the present invention.

FIG. 4 is a flow diagram of an illustrative first method of the present invention. The flow diagram is generally shown at 150, and is entered at element 152. Control is passed to element 154 via interface 156. Element 154 provides a first help file and a second help file. The first help file is stored in a data processing system having a first autonomous application program and a second autonomous application program. The first autonomous application program accesses the first help file and the second autonomous application program accessing the second help file.

Control is passed to element 158 via interface 160. Element 160 provides a hyperlink in the first help file. The hyperlink provides a number of parameters that identify a selected portion of the second help file. Control is then passed to element 162 via interface 164. Element 162 allows the user to activate the hyperlink within the first autonomous application program. Once activated, the hyperlink provides selected ones of the number of parameters to the second autonomous application program. Control is then passed to element 166 via interface 168. Element 166 identifies the selected portion of the second help file using the number of parameters. Control is then passed to element 170 via interface 172. Element 170 displays at least part of the selected portion of the second help file via the second autonomous application program. Control is then passed to element 174 via interface 176, wherein the algorithm is exited.

Figure 5:
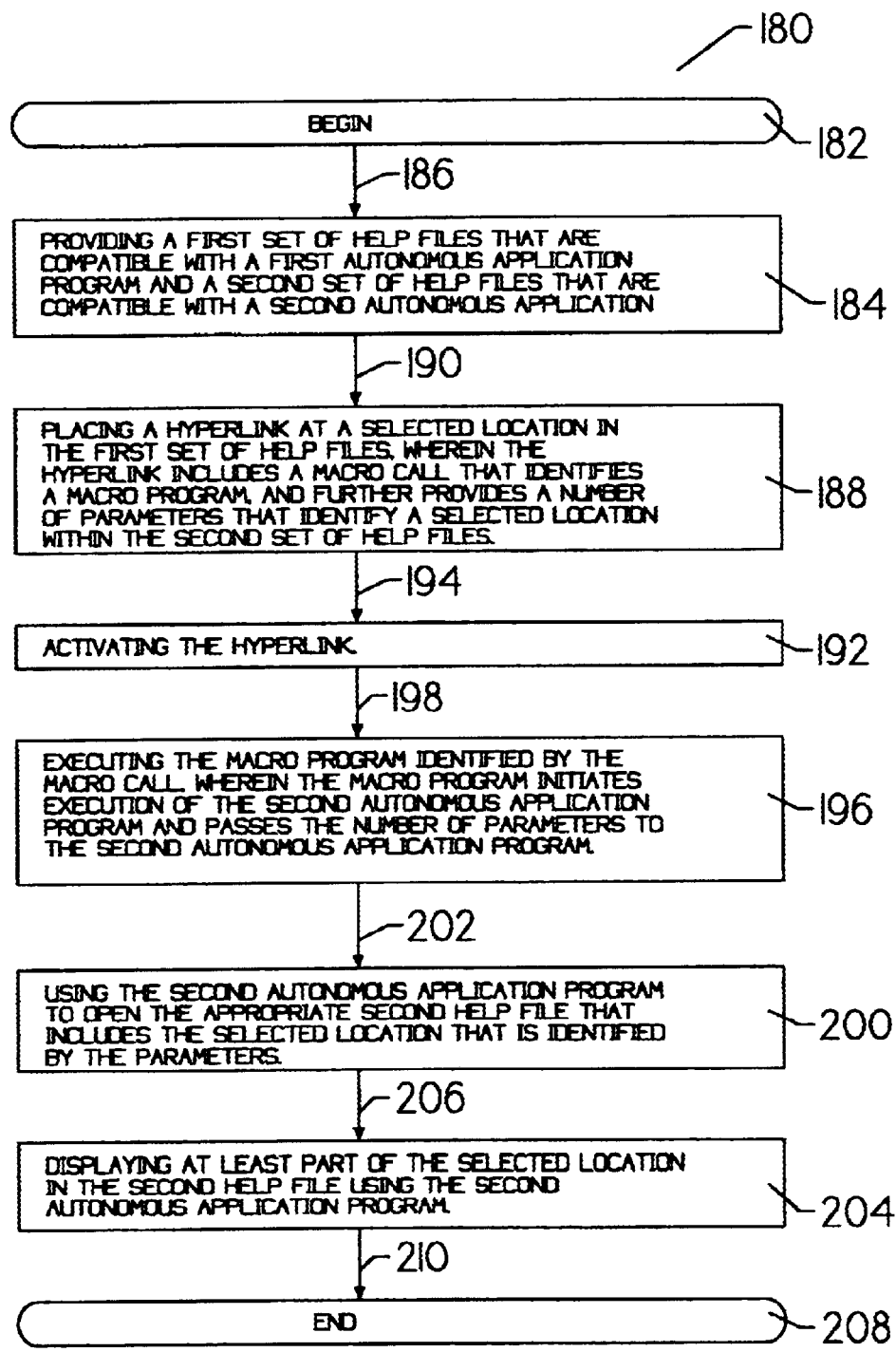
FIG. 5 is a flow diagram of an illustrative second method of the present invention.

FIG. 5 is a flow diagram of an illustrative second method of the present invention. The diagram is generally shown at 180, and is entered at element 182. Control is passed to element 184 via interface 186. Element 184 provides a first set of help files that are compatible with a first autonomous application program and a second set of help files that are compatible with a second autonomous application program.

Control is then passed to element 188 via interface 190. Element 188 places a hyperlink at a selected location in the first set of help files, wherein the hyperlink includes a macro call that identifies a macro program, and further provides a number of parameters that identify the selected location within the second set of help files. Control is then passed to element 192 via interface 194. Element 192 activates the hyperlink. Control is then passed to element 196 via interface 198. Element 196 executes the macro program identified by the macro call. The macro program initiates execution of the second autonomous application program and passes the number of parameters to the second autonomous application program.

Control is then passed to element 200 via interface 202. Element 200 opens the appropriate second help file that includes the selected location in the second help file that is identified by the parameters. This step is preferably performed by the second autonomous application program. Control is then passed to element 204 via interface 206. Element 204 displays at least part of the selected location in the second help file on a display device. This step is also preferably performed by the second autonomous application program. Control is then passed to element 208 via interface 210, wherein the algorithm is exited.

Figure 6:
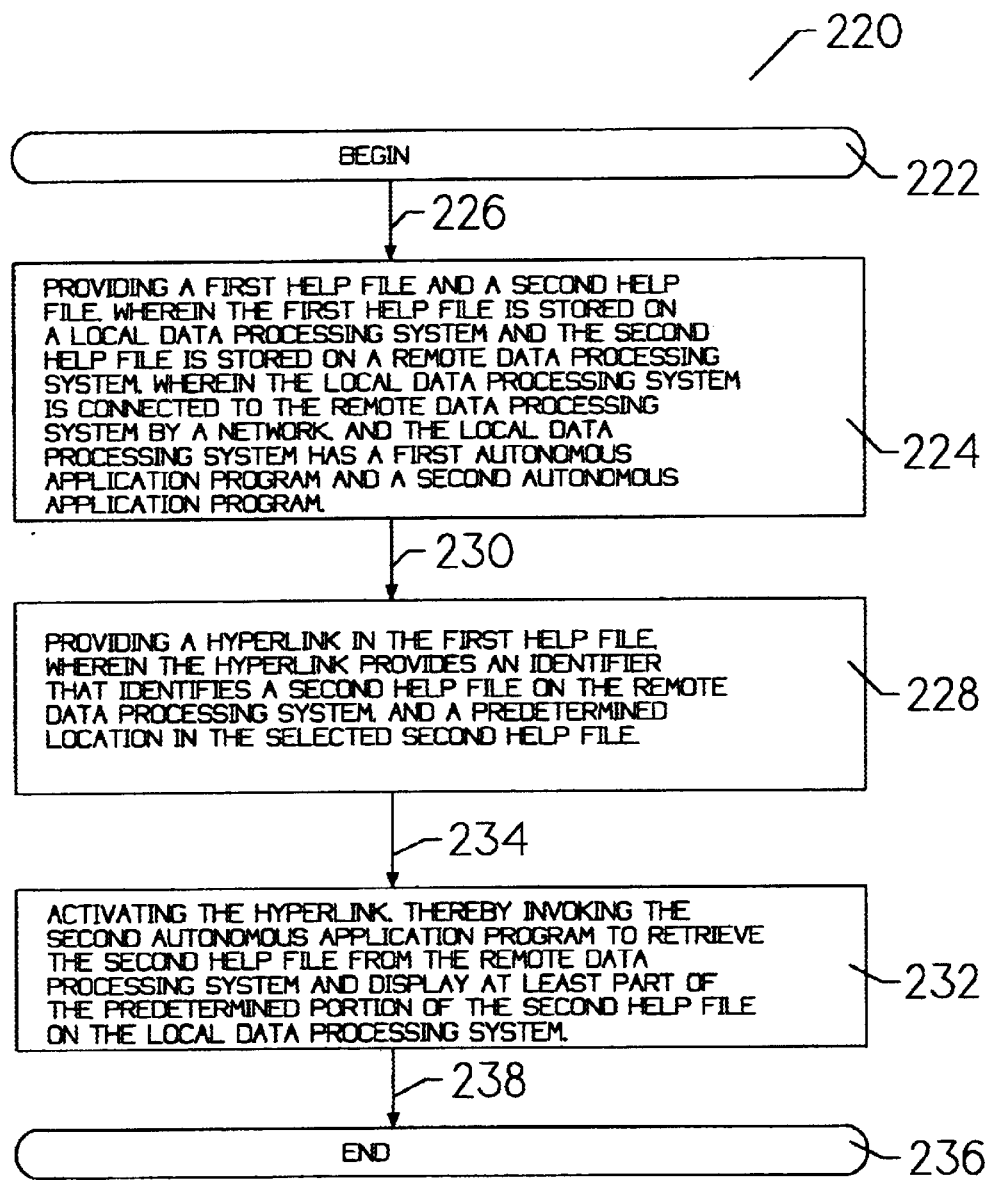
FIG. 6 is a flow diagram of an illustrative third method of the present invention.

FIG. 6 is a flow diagram of an illustrative third method of the present invention. The diagram is generally shown at 220, and is entered at element 222. Control is passed to element 224 via interface 226. Element 224 provides a first help file and a second help file. The first help file is stored on a local data processing system and the second help file is stored on a remote data processing system, wherein the local data processing system is connected to the remote data processing system by a network. The local data processing system has a first autonomous application program and a second autonomous application program.

Control is passed to element 228 via interface 230. Element 228 provides a hyperlink in the first help file. The hyperlink provides an identifier that identifies a second help file on the remote data processing system, and a predetermined location in the selected second help file. Control is then passed to element 232 via interface 234. Element 232 activates the hyperlink. This is preferably performed by a user. Once activated, the hyperlink invokes the second autonomous application program, which retrieves the second help file from the remote data processing system and displays at least part of the predetermined portion of the second help file on the local data processing system. Control is then passed to element 236 via interface 238, wherein the algorithm is exited.

Figure 7:
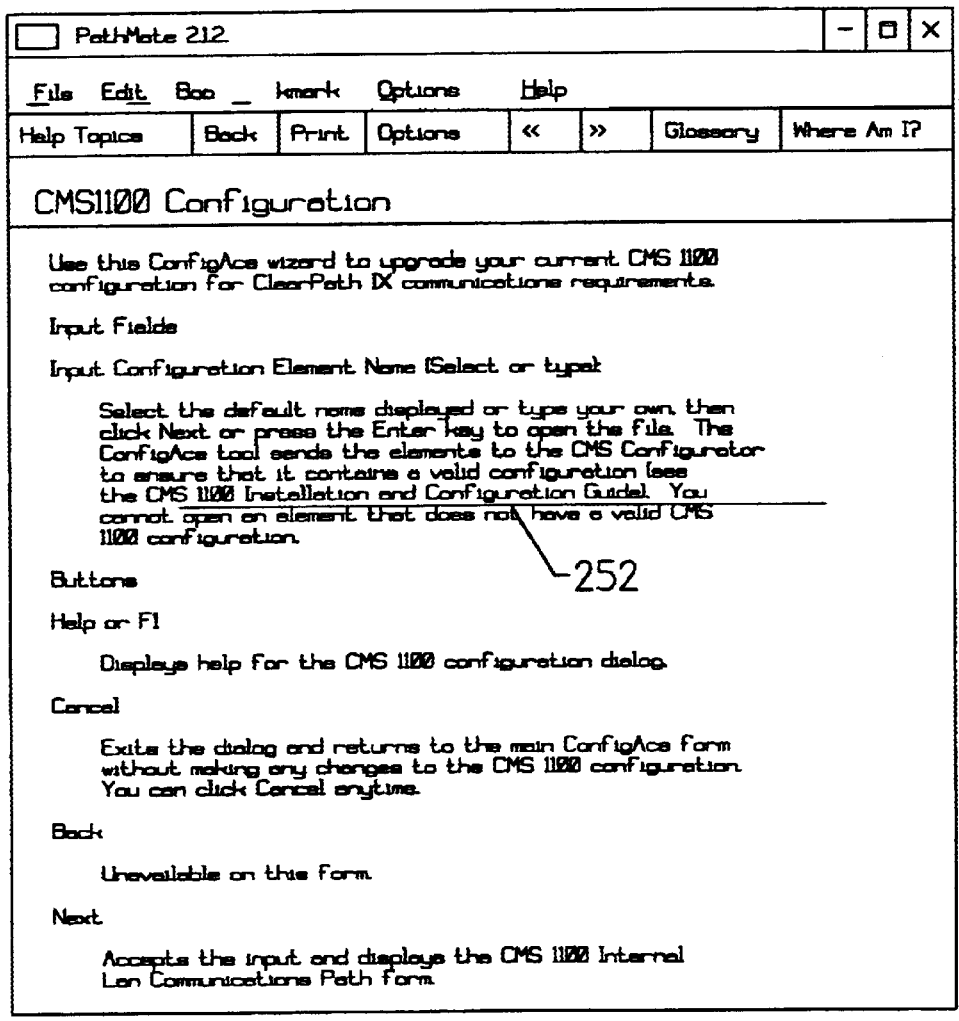
FIG. 7 is a diagram of an illustrative help window having a hyperlink in accordance with a preferred embodiment of the present invention.

FIGS. 7–16 describe the preferred embodiment shown in FIG. 2. FIG. 7 is a diagram of an illustrative help window 250 that has been invoked either through the operating system or a separate application program. The illustrative help window 250 includes a hyperlink 252 as shown. The hyperlink references the "CMS 1100 Installation and Configuration Guide", as indicated by the hyperlinked phrase. The CMS 1100 Installation and Configuration Guide contains more information than is available in the Microsoft Windows™ help system.

When a user activates the hyperlink 252, a UNILIB macro (see FIG. 2) is executed. The hyperlink includes a parameter that identifies the UNILIB macro. The Microsoft Windows™ help engine, which supports the illustrative help window 250, passes selected parameters or ID codes to the UNILIB macro. Preferably, the ID codes include a document code for identifying a particular one of the desired help resource files, and a tag code for identifying a particular tag located therein.

Figure 8:
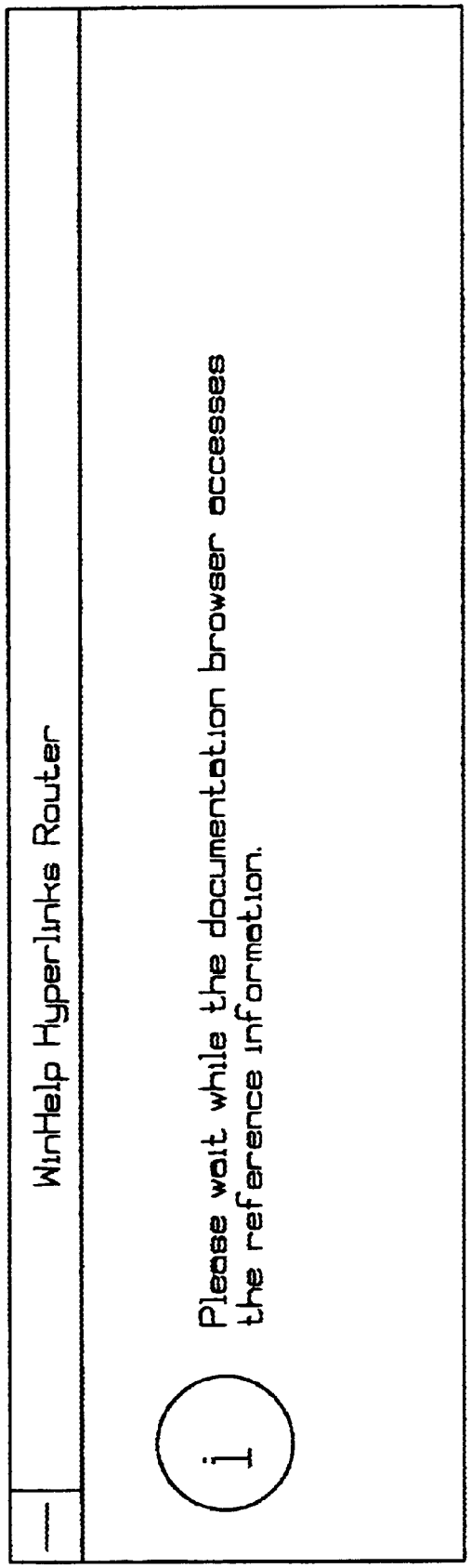
FIG. 8 is a diagram of an illustrative WinHelp Hyperlink Router window that is displayed after the hyperlink of FIG. 7 is activated.
Figure 9:
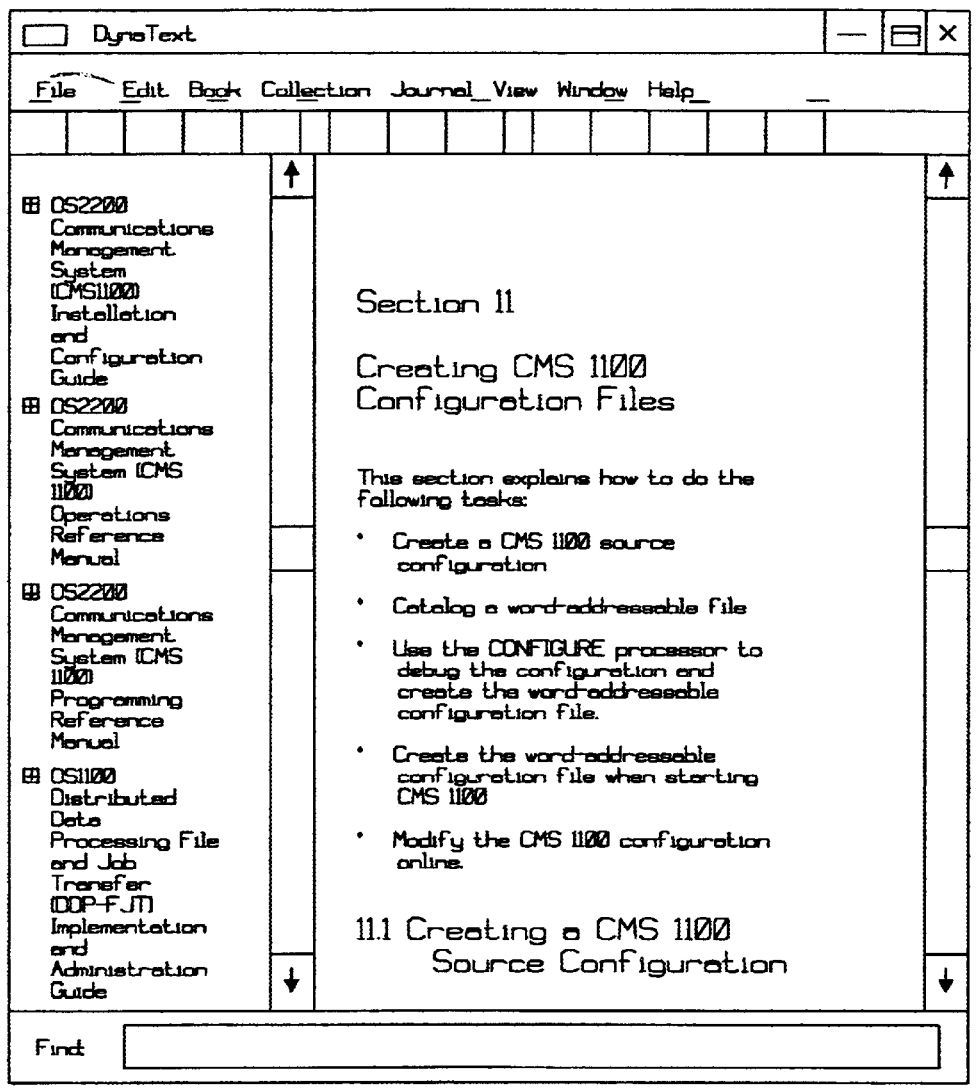
FIG. 9 is a diagram of an illustrative DynaText Browser Window that is displayed after the DynaText Browser is launched by the hyperlink.

The UNILIB macro opens the DynaText browser program and passes the ID codes to the DynaText browser program. Preferably, the WinHelp Hyperlink Router Window shown in FIG. 8 is displayed until the DynaText browser program is opened. The UNILIB macro converts the form of the parameters or ID codes provided by the hyperlink 252 to be compatible with the DynaText browser program. The DynaText browser program uses the ID codes to identify and open the appropriate help resource file and display the desired portion or section indicated by the parameters in a second window on the display device of the data processing system. The resulting window provided by the DynaText Browser program is shown in FIG. 9.

As indicated above, the DynaText browser program can identify tags or other identifiers within the corresponding help resource file. Thus, for the hyperlink 252 to identify a particular portion or section in the desired help resource file, the desired help resource file may have a tag or some other identifier placed in an appropriate location. The ID codes or parameters passed to the DynaText browser program from the UNILIB macro may be used by the DynaText browser program to identify a tag within the desired help resource file. Once identified, the DynaText browser program may display the desired section or portion of the desired help resource file in a second window. The UNILIB macro automatically terminates as soon as the DynaText browser displays the appropriate document.

It is contemplated that the desired help resource files may be located either on the same data processing system as the original application program or on a different data processing system. Preferably, the help resource files are provided on a CD-ROM that is accessible by the DynaText browser program. When provided on a CD-ROM, the hyperlink may provide a logical reference to the corresponding tags in the desired help resource files, rather than a physical reference. The UNILIB macro may then convert the logical reference into a physical reference, as may be required by some applications for accessing the CD-ROM. It is noted, however, that DynaText uses logical references. Thus, UNILIB does not need to do a logical to physical reference conversion in the preferred embodiment.

Figure 10:
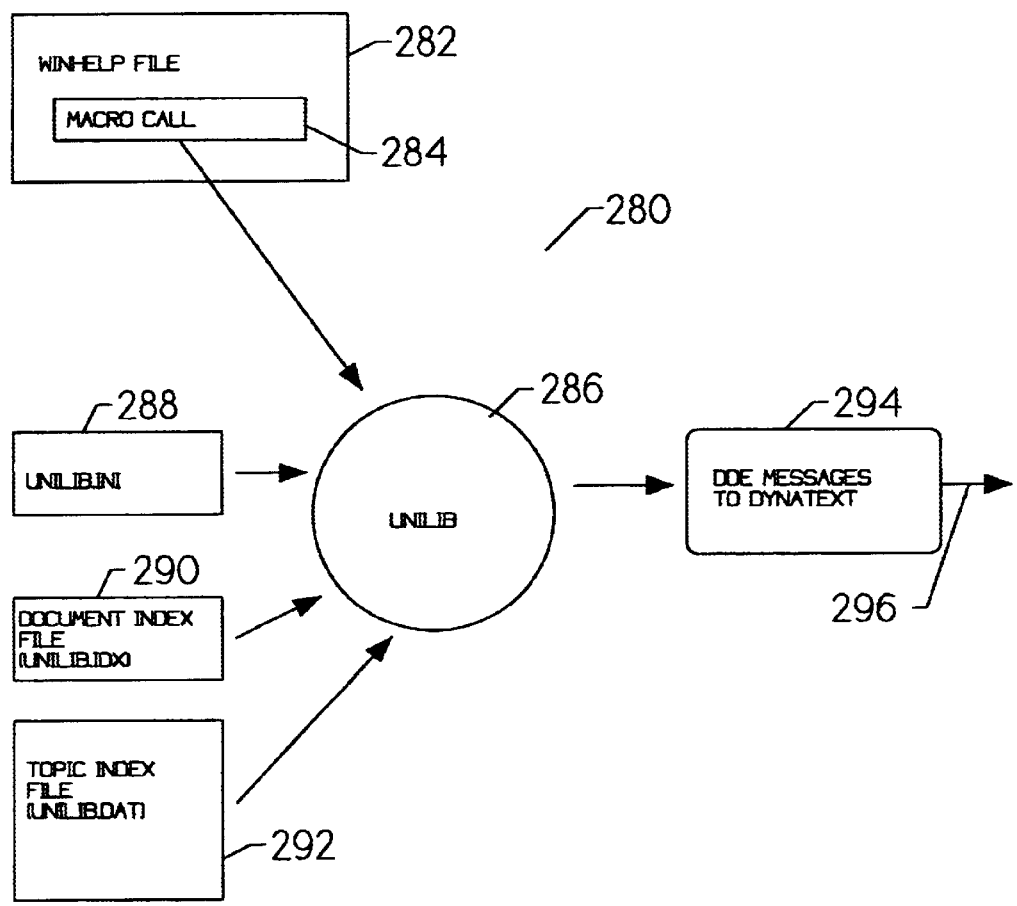
FIG. 10 is a block diagram showing a preferred implementation of the present invention.

FIG. 10 is a block diagram showing a preferred implementation of the present invention. The diagram is generally shown at 280. A Microsoft Windows™ help file 282 includes a hyperlink that provides a macro call 284 to the UNILIB macro 286. The Microsoft Windows™ help file 282 is read and controlled by a Microsoft Windows™ help engine, which executes the UNILIB macro 286 in the Windows™ operating system. The Microsoft Windows™ help engine may be launched from within an application program or from the operating system.

The syntax of the macro call 284 is preferably compatible with the Microsoft Windows™ help engine format. For example, the preferred macro call is "ExecFile ('UNILIB\unilib,document,topic')". The UNILIB field is the name of the macro to be executed. The document field is the number of the destination document, and can be up to eight digits. The topic field identifies an SGML identifier in the desired help resource file.

Selected parameters provided by the hyperlink are passed to the UNILIB macro 286, including the document and topic fields. These parameters identify a desired help resource file, and a particular section or portion of the desired help resource file. The UNILIB macro 286 then performs the following functions:

1. The UNILIB initiation file (UNILIB.INI) 288 is read to determine the workstation-dependent variables for operation. This includes the drive and pathname to the location of the DynaText initialization file (DYNATEXT.INI), the name of the documentation edition being referenced, and other variables that are determined when UNILIB is installed;
2. The document index file (UNILIB.IDX) 290 is read to locate the record for the document parameter;
3. The fields of the document record are read and stored in memory;
4. The document-topic value is made by concatenating the document ID prefix for the document with the topic parameter passed to UNILIB from the hyperlink;
5. The topic index file (UNILIB.DAT) is read to locate the record from the document-topic parameter;
6. The DYNATEXT.INI file for the edition is read to determine the drive and pathnamne for the DynaText database;
7. A message (see FIG. 8) is displayed to help the user make the transition from the online-help environment to the book-browser environment;
8. The DynaText browser is started and the document topic is displayed; and
9. The UNILIB program terminates, leaving the original WinHelp file still on display, and the destination document displayed in the DynaText browser.

After the UNILIB program 286 has completed, the user has the ability to switch between the WinHelp display and the DynaText display. If the user selects another document hyperlink, and the user has not closed the DynaText browser, UNILIB will use the copy of the DynaText browser that is already running to display the new destination document.

The UNILIB program 286 provides the appropriate information to the DynaText browser program (not shown in FIG. 10) using Dynamic Data Exchange messages (DDE) 294. DDE enables Windows™ programs to communicate with each other. The DynaText Browser program can operate as an application server by accepting DDE messages from another application.

Opening a DDE conversation between the UNILIB program 286 and the DynaText browser program requires an application server name and the topic of the conversation. The application server name for the DynaText browser is DTEXT. The topic of the conversation assumes the format "BOOK(bookname, collectiondir)". The bookname field is the name of the directory that contains the desired book. The collectiondir field is the complete pathname of the collection. In the preferred embodiment, the collectiondir parameter is stored in the DYNATEXT.INI file, which is read by the UNILIB program 286.

After the conversation has been initiated, the UNILIB program 286 sends DDE execute and DDE request messages to the DynaText browser program. Further information about DDE operations with DynaText can be found in the DynaText for Windows Publisher Guide, which is incorporated herein by reference. The objectives of the conversation are to send a DDE execute message to display the specific topic from the library containing the specified document.

FIG. 11 is a table showing the preferred fields for the UNILIB.INI file of FIG. 10. The diagram is generally shown at 310. The UNILIB initialization file UNILIB.INI stores parameter values needed by the UNILIB macro during operation. There are two primary sections in the UNILIB.INI file including the UNILIB section 312 and the DTEXT section 314, as shown.

Two parameters are specified in the UNILIB section 312 including the UNILIB_VERSION parameter and the BROWSER parameter. The UNILIB_VERSION parameter specifies the desired version of the UNILIB macro. The BROWSER parameter specifies the type of browser to be invoked by the UNILIB macro. In the preferred embodiment, the BROWSER parameter is set to the value DTEXT, which corresponds to the DynaText browser program.

The DTEXT section 314 includes six parameters including the DOC_INDEX parameter, the TOPIC_INDEX parameter, the PROGRAM parameter, the DTEXT_INI_PATH parameter, the EDITION_NAME parameter and the COLLECTION_NAME parameter. The DOC_INDEX parameter specifies the pathname and filename of the document index (UNILIB.IDX). The TOPIC_INDEX parameter specifies the pathname and filename of the topic index (UNILIB.DAT). The PROGRAM parameter specifies the pathname and filename of the DynaText Browser executable file. The DTEXT_INI_PATH parameter specifies the pathname to the location of the DYNATEXT.INI file for the selected edition. The EDITION_NAME parameter specifies the name of the selected edition. Finally, the COLLECTION_NAME parameter specifies a string value of the name of the DynaText collection contained in the DYNATEXT.INI file.

An illustrative UNILIB.INI file is shown at 320. The section titles are shown in square brackets [0]. The UNILIB section specifies which browser to open when the UNILIB macro is invoked by a hyperlink. The DTEXT section provides applicable parameters for the browser specified in the UNILIB section.

FIG. 12 is a table showing the preferred fields for the document index (UNILIB.IDX) file of FIG. 10. The diagram is generally shown at 350. An illustrative document index file is shown at 352. The document index file contains a record for each document in an edition. An edition is a collection of help resource files that can be read using the DynaText browser program. Preferably, each document identified by the document index file (UNILIB.IDX) has five primary fields associated therewith. These field include the DOCUMENT NUMBER field, the LIBRARY NAME field, the DOCUMENT ID PREFIX field, the TOPIC INDEX OFFSET field, and the EDITION name field.

The DOCUMENT NUMBER field specifies the base document number of the corresponding destination document. This number corresponds to the document ID number encoded with the hyperlink of the present invention. The LIBRARY NAME field specifies the name of the DynaText library that contains the corresponding document. The DOCUMENT ID PREFIX field identifies the SGML identifier prefix for the topic within the selected library. The help resource files read by the DynaText browser are in a version of the SGML format. The DOCUMENT ID PREFIX is provided by the edition definition.

The TOPIC INDEX OFFSET field specifies the byte offset to the first record in the topic index file (see FIG. 13). The EDITION NAME field specifies the name of the selected edition.

An exemplary document index file (UNILIB.IDX) is shown at 352. The first entry specifies a DOCUMENT NUMBER of 78449139, a LIBRARY NAME of 4GLIB, a DOCUMENT PREFIX of AAC, and a topic OFFSET of 749. The records are in the same order as the corresponding documents occur in each library. The order of the libraries is arbitrary in the preferred embodiment.

FIG. 13 is a table showing the preferred fields for the topic index file (UNILIB.DAT) of FIG. 10. The topic index contains a record for each topic in the edition. The topics correspond to the "tags" described above with reference to FIGS. 1–6. Each record in the topic index corresponds to a single topic within a help resource file.

Data field 384 includes the TOPIC ID value in the help resource file. The TOPIC ID's are attached to selected locations, or levels, within the selected document. As indicated above, the help resource files are preferably in the SGML format. The topic ID value is the concatenation of the DOCUMENT ID PREFIX field (see FIG. 12) and the SGML identifier for various levels or locations within the destination document. The SGML identifier, or tag, is provided within the help resource file by the product support personnel.

The records in the Topic index file are grouped according to the document to which they correspond. For example, records 300 through 345 could be for document number 78331234. All records for document 78331234 are grouped together in the topic index file. The byte offset for the location of the first record 300 would be recorded in the TOPIC INDEX OFFSET field of the document index file (see FIG. 12) for document 78331234.

A portion of an exemplary UNILIB.DAT file is shown at 382. The first entry shows a DOCUMENT TOPIC ID, which is the concatenation of the DOCUMENT ID PREFIX "AAC" and the SGML identifier, or tag, "THING1".

Having thus described the preferred embodiment of the present invention, those of skill in the art will readily appreciate the many additional embodiments which may be implemented using the teachings found herein and within the scope of the claims hereto attached and wherein we claim.

What is claimed is:

1. In a data processing system having a first autonomous computer program that references a number of first help files, and a second autonomous computer program that references a number of second help files, the improvement comprising;
    a hyperlink in one of the number of first help files that references a predetermined portion of a selected one of the number of second help files, wherein the activation of the hyperlink by a user within the first autonomous computer program causes the second autonomous computer program to display at least part of the predetermined portion of the selected second help file; and
    wherein the first autonomous computer program and the number of first help files are compiled.

2. In a data processing system having a first autonomous computer program that references a number of first help files, and a second autonomous computer program that references a number of second help files, the improvement comprising:
    a hyperlink in one of the number of first help files that references a predetermined portion of a selected one of the number of second help files, wherein the activation of the hyperlink by a user within the first autonomous computer program causes the second autonomous computer program to display at least part of the predetermined portion of the selected second help file; and
    wherein the activation of the hyperlink by the user provides a macro call to the first autonomous computer program, wherein the macro call includes a number of predetermined parameters.

3. A data processing system according to claim 2 wherein the number of predetermined parameters uniquely identify a selected one of the number of second help files, and the predetermined portion of the selected second help file.

4. A data processing system according to claim 3 wherein at least one of the number of parameters identifies a macro program.

5. A data processing system according to claim 4 wherein the macro call executes the macro program.

6. A data processing system according to claim 5 wherein the data processing system has an operating system executing thereon, and wherein the first autonomous computer program executes the macro program by providing an appropriate execution command to the operating system of the data processing system.

7. A data processing system according to claim 6 wherein the macro program initiates the execution of the second autonomous computer program.

8. A data processing system according to claim 7 wherein the macro program passes a compatible form of a number of the predetermined parameters to the second autonomous computer program.

9. A data processing system according to claim 8 wherein the second autonomous computer program receives the predetermined parameters, reads the selected one of the second help files, and displays at least part of the predetermined portion of the selected second help file.

10. A data processing system according to claim 9 wherein the selected second help file includes a number of tags therein, wherein selected ones of the number of tags uniquely identify the predetermined portion of the selected second help file.

11. A data processing system according to claim 10 wherein the number of parameters are used by the second autonomous computer program to identify a particular set of tags within the second help file.

12. A data processing system according to claim 7 wherein the macro program detects if a first copy of the second autonomous computer program is already running on the data processing system before initiating the execution of the second autonomous computer program.

13. A data processing system according to claim 12 wherein the macro program does not initiate a second copy of the second autonomous computer program if the macro program detects that a first copy is already running on the data processing system.

\* \* \* \* \*